United States Patent
Soucy et al.

(10) Patent No.: US 7,784,884 B2
(45) Date of Patent: Aug. 31, 2010

(54) ELASTOMERIC TRACK WITH GUIDE LUG REINFORCEMENTS

(75) Inventors: Gilles Soucy, Drummondville (CA); Marc Delisle, Sherbrooke (CA); André Deland, Drummondville (CA)

(73) Assignee: Soucy International Inc., Drummondville, QC (CA)

( * ) Notice: Subject to any disclaimer, the term of this patent is extended or adjusted under 35 U.S.C. 154(b) by 105 days.

(21) Appl. No.: 11/935,104

(22) Filed: Nov. 5, 2007

(65) Prior Publication Data

US 2008/0100134 A1    May 1, 2008

Related U.S. Application Data

(63) Continuation-in-part of application No. 10/791,571, filed on Mar. 3, 2004, now abandoned.

(51) Int. Cl.
*B62D 55/24* (2006.01)
(52) U.S. Cl. .......................... 305/175; 305/171; 305/179
(58) Field of Classification Search .................. 305/167, 305/170–171, 173–177, 178–179, 165
See application file for complete search history.

(56) References Cited

U.S. PATENT DOCUMENTS

| | | | |
|---|---|---|---|
| 3,747,995 A | 7/1973 | Russ, Sr. | |
| 5,020,865 A * | 6/1991 | Edwards et al. | 305/182 |
| 5,145,242 A | 9/1992 | Togashi | |
| 5,295,741 A | 3/1994 | Togashi et al. | |
| 5,363,936 A * | 11/1994 | Grawey et al. | 180/9.21 |
| 5,380,076 A | 1/1995 | Hori | |
| 5,447,365 A | 9/1995 | Muramatsu et al. | |
| 5,484,321 A | 1/1996 | Ishimoto | |
| 5,540,489 A | 7/1996 | Muramatsu et al. | |
| 5,984,438 A | 11/1999 | Tsunoda et al. | |
| 5,997,110 A | 12/1999 | Katoh et al. | |
| 6,176,557 B1 | 1/2001 | Ono | |
| 6,300,396 B1 | 10/2001 | Tsunoda et al. | |
| 6,793,296 B2 | 9/2004 | Deland et al. | |
| 6,843,539 B2 * | 1/2005 | Tsuru | 305/170 |
| 6,932,442 B2 | 8/2005 | Hori | |
| 6,942,305 B2 | 9/2005 | Ueno | |
| 7,201,457 B2 * | 4/2007 | Katoh et al. | 305/194 |
| 7,407,236 B2 * | 8/2008 | Fukushima | 305/171 |
| 2003/0015918 A1 | 1/2003 | Hori | |
| 2004/0222697 A1 * | 11/2004 | Soucy et al. | 305/165 |

(Continued)

FOREIGN PATENT DOCUMENTS

EP    0304390    2/1989

(Continued)

*Primary Examiner*—Jason R Bellinger
(74) *Attorney, Agent, or Firm*—Brouillette & Partners; Robert Brouillette; Francois Cartier

(57) ABSTRACT

This invention relates to an endless elastomeric traction band that is used to propel tracked vehicles. The traction band generally comprises a main body defining an outer ground-engaging surface and an inner wheel-engaging surface. The outer surface is generally provided with ground-engaging traction lugs. The inner surface of the traction band is preferably provided with one or more row of longitudinally aligned guide lugs and one or more rows of longitudinally aligned drive lugs. Additionally, guide lug reinforcements are inserted into said guide lugs and said band body to laterally reinforce the guide lugs and minimize de-tracking occurrences.

8 Claims, 9 Drawing Sheets

U.S. PATENT DOCUMENTS

2004/0224118 A1 * 11/2004 Tsuru .......................... 428/58

FOREIGN PATENT DOCUMENTS

| JP | 55068477 | 5/1980 |
|---|---|---|
| JP | 55087667 | 7/1980 |
| JP | 60061378 | 4/1985 |
| JP | 6234378 | 8/1994 |

* cited by examiner

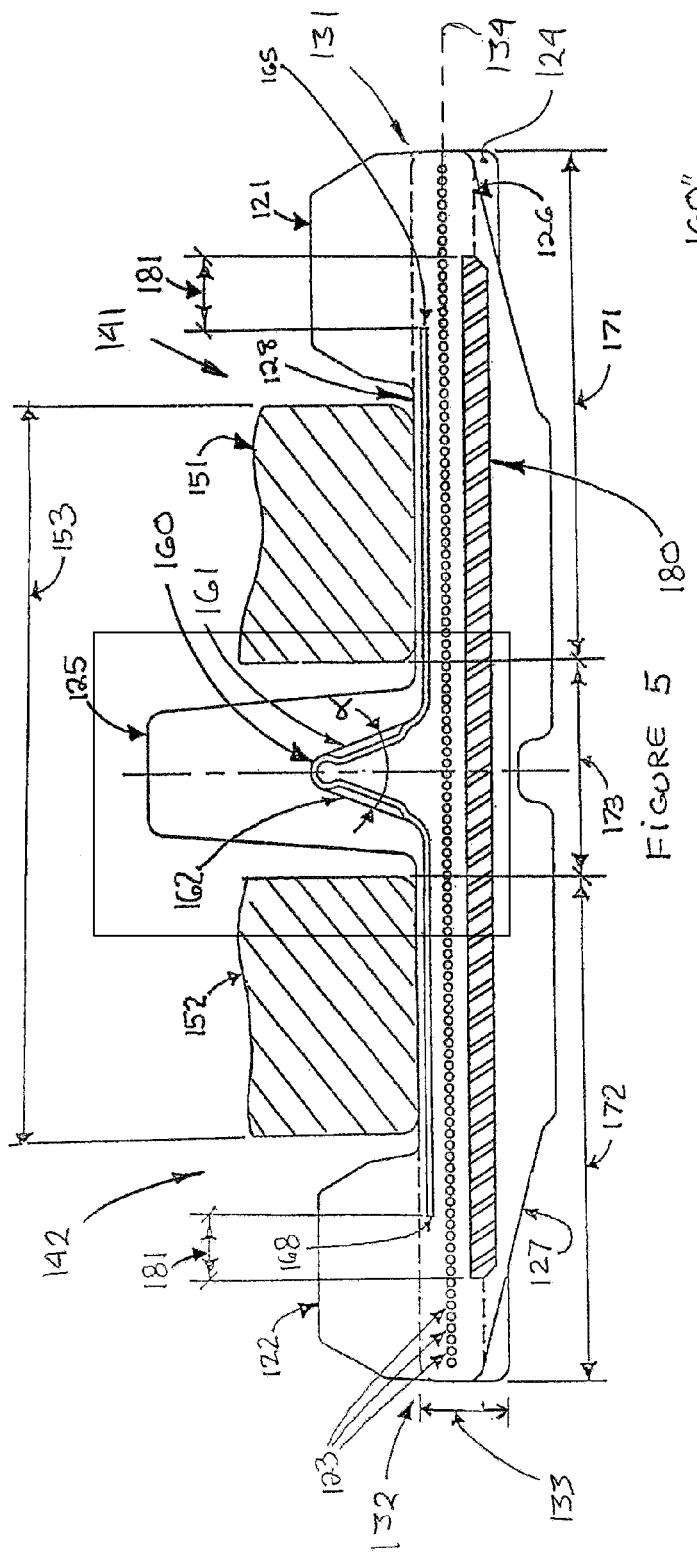
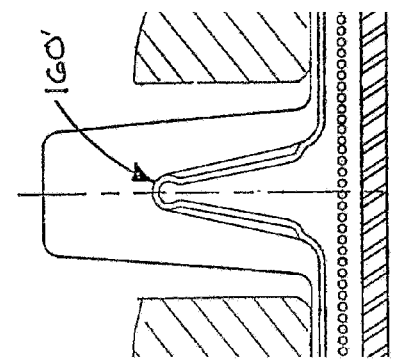

ELASTOMERIC TRACK WITH GUIDE LUG REINFORCEMENTS

CROSS-REFERENCE TO RELATED APPLICATIONS

The present patent application is a continuation-in-part of commonly assigned U.S. patent application Ser. No. 10/791,571, filed Mar. 3, 2004 now abandoned and claims the benefits of priority thereof. The disclosure of U.S. patent application Ser. No. 10/791,571 is incorporated herein by reference.

FIELD OF THE INVENTION

The present invention generally relates to tracked vehicles which use elastomeric tracks for propulsion. More particularly, the present invention relates to the elastomeric tracks used on such tracked vehicles. Without being limitative in nature, the present invention particularly relates to elastomeric tracks for use on heavy tracked vehicles (i.e. vehicles weighing 5000 kg or more) such as military vehicles (e.g. tanks and transport vehicles) and heavy machinery (e.g. excavators, bulldozers and forestry equipments).

BACKGROUND OF THE INVENTION

Numerous types of vehicles are frequently used on terrain where it is difficult for pneumatic tires to operate. Both military vehicles, such as tanks and amphibious vehicles, and civilian vehicles, such as tractors and recreational vehicles, are sometimes utilized on terrains which are very soft, for example sand surfaces. Pneumatic tires are not capable of efficient operations on such soft surfaces, as they tend to burrow into the surface, rather than riding across it.

In the past, the most popular types of traction bands for use on heavy vehicles have been those using metallic links.

Recently, elastomeric endless traction bands have become popular due to an increase in the number of construction sites where vehicles having traction bands must also drive on the pavement and because there is also a demand for vehicles used for low soil compaction farming, and over snow covered, very uneven, or muddy terrain. With the combination of elastomeric technology and a tremendous amount of trial and error, various types of traction bands using elastomeric materials are now available in the industry. They are used on excavators, dump carriers, boring machines, combines, tractors, and the like.

While endless traction bands using elastomeric materials are often desirable since they reduce damage to the terrain over which they are used, reduce noise and allow access to various types of soil, they do have some drawbacks concerning their use. Once installed, the traction band is usually carried and maintained in tension by a plurality of rotating elements (e.g. sprocket wheel, tension wheel and road wheels) that are connected to the vehicle. The rotating elements cooperate with the inner surface of the traction band which generally comprises a plurality of guide lugs and drive lugs, respectively ensuring lateral support and power transmission to the traction band. The guide lugs are disposed in one or more rows along the inner circumference of the traction band in order to offer lateral guidance by restraining the relative motion of the wheel-band assembly. The drive lugs are disposed in one or more rows along the inner circumference of the traction band in order to provide power transmission by meshing between with the sprocket wheel.

However, since elastomeric traction bands are more easily deformed than metal bands, the wear and the use of the traction band under extreme conditions sometimes lead to de-tracking occurrences. De-tracking is mostly initiated by a combined action of friction and interference between the wheels and the guide lugs, which induces a lateral deformation of the elastomeric guide lugs. At this stage, the wheels are misaligned with the traction band and as the traction band continues to rotate and the guide lugs keep on laterally deforming, the rotating wheels sometimes climb on the lateral sides of the guide lugs, until de-tracking of the traction band is observed.

To avoid this problem, different guide lug configurations have been created from various elastomeric compositions or shapes. For instance, Tsunoda et al. (U.S. Pat. No. 6,300,396B1) and Muramatsu et al. (U.S. Pat. Nos. 5,447,365 and 5,540,489) have inserted plate-like member in the guide lugs whereas Tsunoda et al. (U.S. Pat. No. 5,984,438) have inserted rod-like member. The members have some low-friction surfaces exposed to the outside of the guide lugs which contact and collide with the wheels. These low-friction materials reduce de-tracking occurrences but to be effective, they need a direct contact with a wheel. Also, the lateral movement of the guide lugs with respect to the track is not significantly diminished under high lateral loads, even if a member has been inserted in the guide lug.

In Hori (U.S. Pat. No. 5,380,076), Togashi et al. (U.S. Pat. No. 5,295,741) and Ono (U.S. Pat. No. 6,176,557), core bars for crawler-type tracks are partially inserted in the elastomeric material, having a central portion which is not embedded in the elastomeric material and acts as a guide lug, and laterally extending winged portions which are embedded in the elastomeric material and which generally provide lateral rigidity to the track. Even though core bars are rigidly connected with respect to the track, the "guide lug" portion of the central portion has a shape configuration which is restricted to the configuration of the wheels. Additionally, since the guide lug portions of the core bars are integrally formed with the laterally extending winged portions, lateral forces applied on the guide lug portions will tend to induce a rotational and/or torsional movement of the whole track, thereby increasing the probability of de-tracking. Also, by locating the core bars near the inner surface of the track, the portion of the elastomeric material located between the neutral axis of the track and the inner surface thereof can be subjected of high level of compression. At high speed, these high levels of compression can generate excessive heat in the elastomeric material which may provoke delamination and ultimately failure of the track. Moreover, core bars are usually heavy and tend to induce excessive vibrations when the vehicle is used at high speed.

Since it is almost impossible to laterally or longitudinally enlarge the guide lugs because of their localization into the spacing generated by each wheel assembly, de-tracking events may still occur, especially when such a traction band is installed on a heavy and fast vehicle, like a military vehicle.

The present invention sets out to solve the problem associated with de-tracking events by providing a novel endless track construction.

SUMMARY OF THE INVENTION

The objective of this invention is to provide an innovative endless elastomeric traction band or track which offers a workable solution to the de-tracking occurrences. The elastomeric bands are usually more easily deformed than metallic bands. The wear and the use of the traction band under extreme conditions, like high lateral loads, sometimes initiates de-tracking events which are usually generated by a combined action of friction and interference between the wheels and the guide lugs.

The elastomeric track of the present invention generally comprises a main body which defines a ground-engaging outer surface and a wheel-engaging inner surface. The track body also generally comprises laterally extending stiffening elements, for providing lateral rigidity to the track body, and longitudinally extending reinforcing tensile cables, for providing longitudinal strength to the track body. Both the stiffening elements and the tensile cables are generally embedded into the body of the track.

The laterally extending stiffening elements, which are generally provided as laterally extending rods or bars, are preferably, but not exclusively, made of composite materials such as fiberglass. The stiffening elements are preferably rigid to effectively provide lateral rigidity to the track body yet resilient enough to absorb temporary deformation. Preferably, the stiffening elements are disposed between the neutral axis of the track and the outer surface thereof.

The longitudinally extending reinforcing tensile cables are generally located along the neutral axis of the track. Additionally, the reinforcing cables are generally adjacently disposed in a laterally extending and preferably continuous close array.

In order to provide traction to the vehicle onto which the track is mounted, the ground-engaging outer surface is preferably provided with ground engaging traction lugs. The traction lugs are generally disposed on the outer surface of the track according to a pattern which is chosen depending on the terrain upon which the vehicle is used. Understandably, the traction lugs can come in a plurality of shapes according to the intended use of the track. The present invention is not limited to any particular shape of traction lugs.

The inner surface of the track is generally adapted to cooperate with a sprocket wheel and also with road and idler wheels. Accordingly, the inner surface of the track generally comprises one or more rows of preferably longitudinally aligned drive lugs which are adapted to drivingly mate with the sprocket wheel in order to effect the transmission of power between the sprocket wheel and the track. Preferably, but not exclusively, the drive lugs are disposed near the side edges of the track.

Furthermore, the inner surface of the track also comprises at least one row of longitudinally aligned guide lugs. The guide lugs are preferably generally centrally located with respect to the width of the track though other configurations are also possible. For example, a row a guide lugs could be provided along each lateral edge of the track. The guide lugs are used to guide the track over the sprocket, road and idler wheels and hence, to prevent de-tracking. Accordingly, the guide lugs are generally neither adapted nor used to drive the track.

In one embodiment, this invention introduces guide lug reinforcements to the endless traction band made from elastomeric materials, in the form of sheet-like plates, cords, rods or fabric destined to be inserted and integrally molded at a selected interval into the traction band. The guide lug reinforcements are disposed in such numbers, as required, to enhance the lateral rigidity and the resiliency of the guide lugs with respect to de-tracking occurrences.

However, contrary to the prior art, namely U.S. Pat. Nos. 5,295,741, 5,380,076 and 6,176,557, wherein the guide lug reinforcements were an extension of the laterally extending core bars, the guide lugs reinforcements of the present invention are physically distinct from the laterally extending stiffening elements and, accordingly, do not provide lateral rigidity to the body of the endless track.

In a preferred embodiment, each guide lug reinforcement laterally supports and reinforces a guide lug and comprises a reinforcing portion and at least one, but preferably two, stabilizing portions laterally extending on each side of the reinforcing portion. The stabilizing portions are preferably substantially flat and are embedded into the body of the track. Preferably, but not exclusively, the stabilizing portions are located between the inner surface of the track and neutral axis thereof.

The reinforcing portion is preferably provided as an inverted V-shaped portion when viewed along the longitudinal direction of the track. The apex of the reinforcing portion preferably points toward the top of the guide lug. Additionally, in the preferred embodiment, the reinforcing portion extends in the guide lug beyond at least half of the height thereof. When the guide lug reinforcement is provided as a plate (e.g. steel plate), embossing may be used in the two inclined sections of the inverted V-shaped reinforcing portion to optimize the lateral rigidity of the guide lug reinforcement. Other configurations are also possible.

Preferably, the total width of the reinforcing portion and the two stabilizing portions laterally extend beyond the lateral width defined by the two longitudinally split pair of wheels. In other words, the stabilizing portions of the guide lug reinforcement preferably laterally extend over the width of the wheel path defined between the guide lugs and the drive lugs and preferably also over at least a portion of the width of the drive lugs.

The guide lug reinforcements help to laterally stabilize the wheels/traction band assembly as the traction band rotates. The guide lugs lateral deformation by the wheels is reduced and preferably prevented by the guide lug reinforcements which provide a rigid yet resilient lateral support. The reinforcements, with their vertically inclined planar areas, first absorb the lateral forces and then redirect the misaligned track toward its usual operating position.

In accordance with the present invention, since the guide lug reinforcements are physically distinct from the stiffening elements embedded into the body of the track, the lateral deformation of the guide lug reinforcements is not directly transmitted to the stiffening elements as in the prior art. Indeed, by providing one or more intermediate layers of elastomeric material between the guide lug reinforcements and the stiffening elements, these layers of elastomeric materials can further absorb a portion of the lateral or shear forces applied to the guide lugs, reducing rotational and/or torsional movements of the whole track and further preventing occurrences of de-tracking.

Furthermore, since the guide lug reinforcements and the stiffening elements are physically distinct, each of which can be optimally located in the track body according to their respective purposes. Hence, the stabilizing portions of the guide lug reinforcements can be embedded into the body of the track between the neutral axis and the inner surface whereas the stiffening elements can be embedded into the body of the track between the neutral axis and the outer surface. Notably, by locating the stiffening elements between the neutral axis and the outer surface and by providing essentially flat stabilizing portions, it becomes possible to reduce the thickness of the portion of the body of the track between the neutral axis and the inner surface.

Other aspects and many of the attendant advantages will be more readily appreciated as the same becomes better understood by reference to the following detailed description and considered in connection with the accompanying drawings in which like reference symbols designated like elements throughout the figures.

The features of the present invention which are believed to be novel are set forth with particularity in the appended claims.

BRIEF DESCRIPTION OF THE DRAWINGS

FIG. 5 is a section view taken along line 5-5 in FIG. 4 showing one embodiment of the guide horn reinforcement.

FIGS. 5A and 5B are partial section views of variants of the reinforcing portion of the guide lug reinforcement shown in FIG. 5.

DETAILED DESCRIPTION OF THE PREFERRED EMBODIMENTS

A traction band equipped with guide lug reinforcements is described hereinafter according to a preferred embodiment of the present invention and illustrated in the appended figures.

Figure 1:
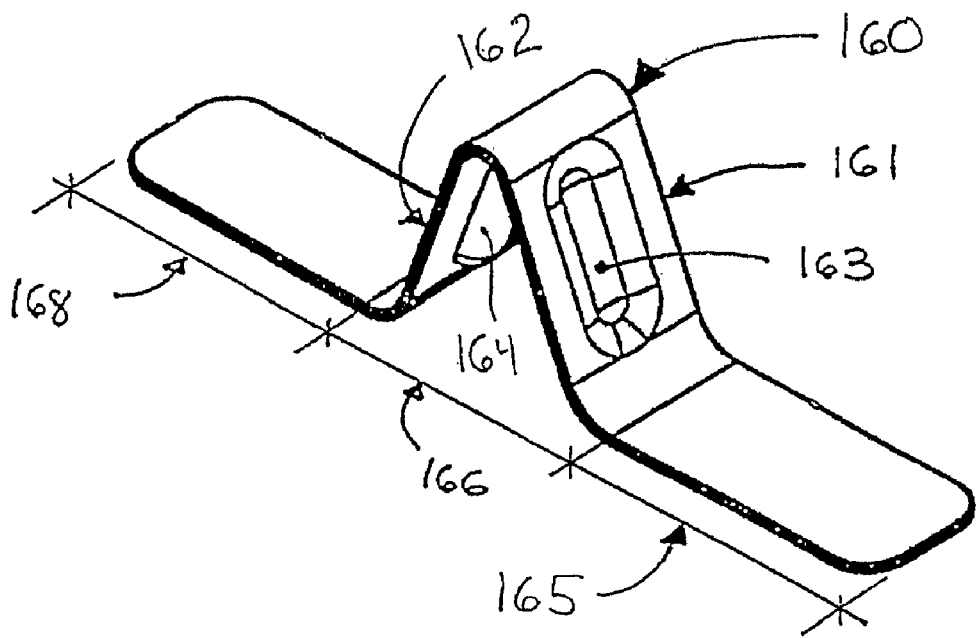
FIG. 1 is an isometric view of a guide horn reinforcement in accordance with the invention.

FIG. 1 shows an isometric representation of a guide lug reinforcement 160 which preferably, but not exclusively, consists of a formed plate (e.g. steel plate), destined to be inserted and integrally molded into an endless elastomeric traction band 120, in order to enhance the resistance with regards to de-tracking occurrences.

Figure 4:
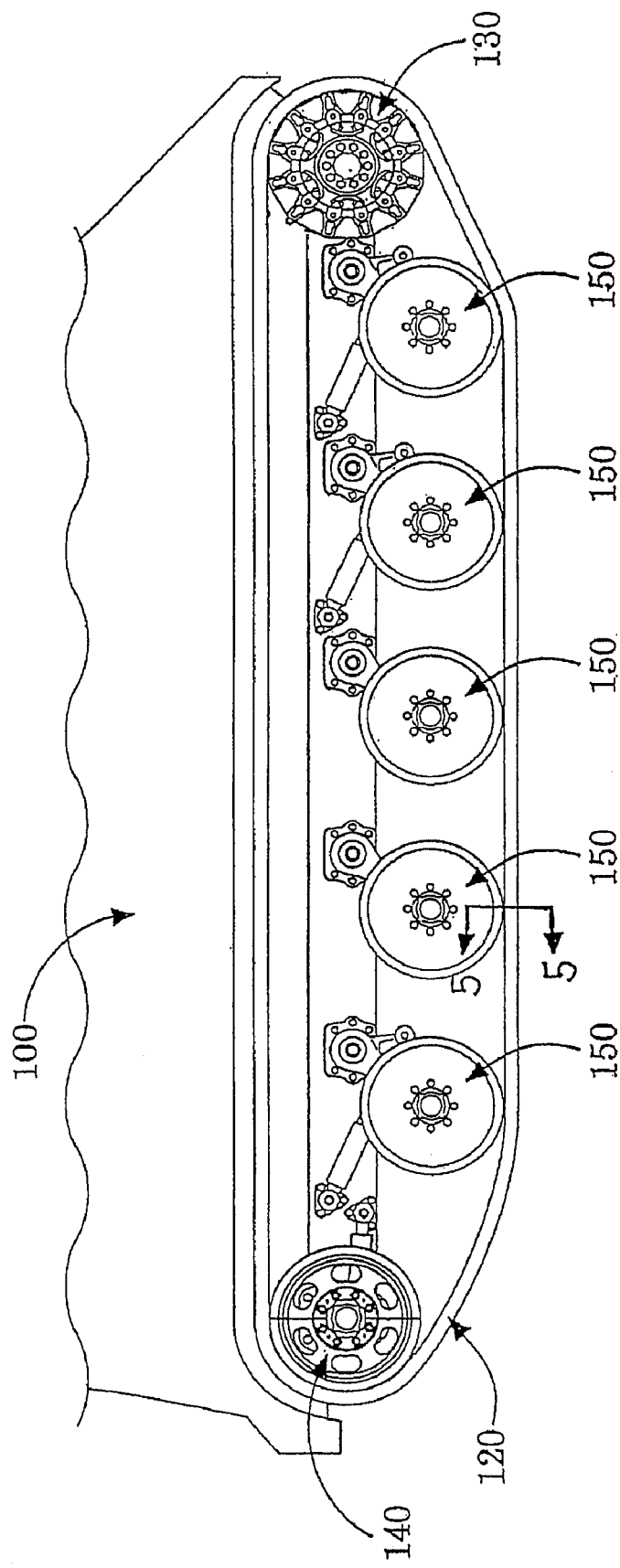
FIG. 4 is a lateral view of a tracked vehicle making use of an endless traction band equipped with the guide horn reinforcements shown in FIG. 1.

A vehicle 100 equipped with an endless track 120 is shown in FIG. 4. It comprises a sprocket wheel 130 which allows power transmission from the vehicle 100 to the traction band 120, a tension wheel 140 and a plurality of road wheels 150 which support the vehicle and guide the traction band 120. This system is coupled to appropriate drive means (not shown) through an appropriate suspension system (not shown). A similar system is disposed on the other side of the vehicle 100.

Figure 5C:
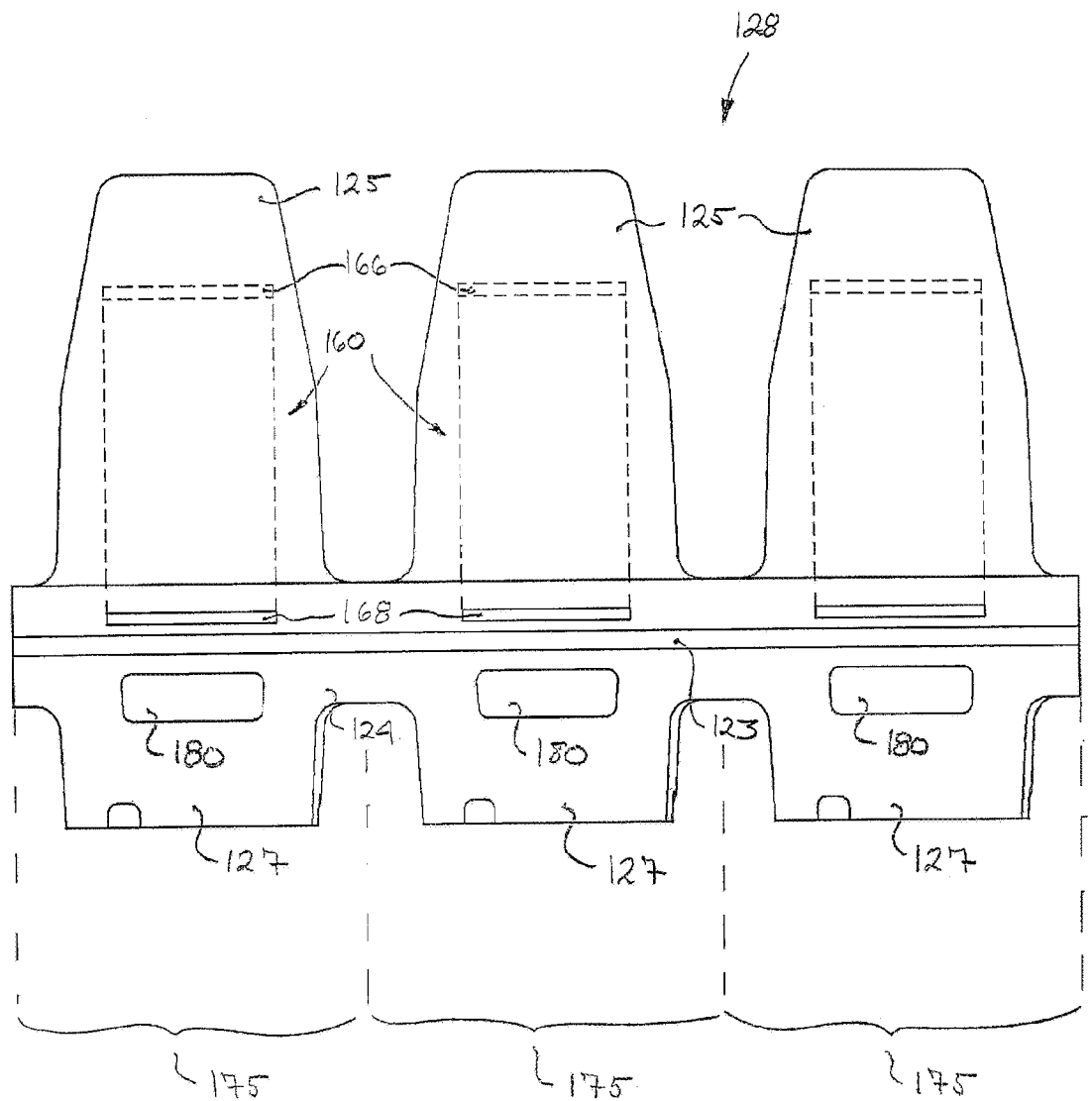
FIG. 5C is a cross-sectional side view of the traction band equipped with the guide horn reinforcements shown in FIG. 4.
Figure 6:
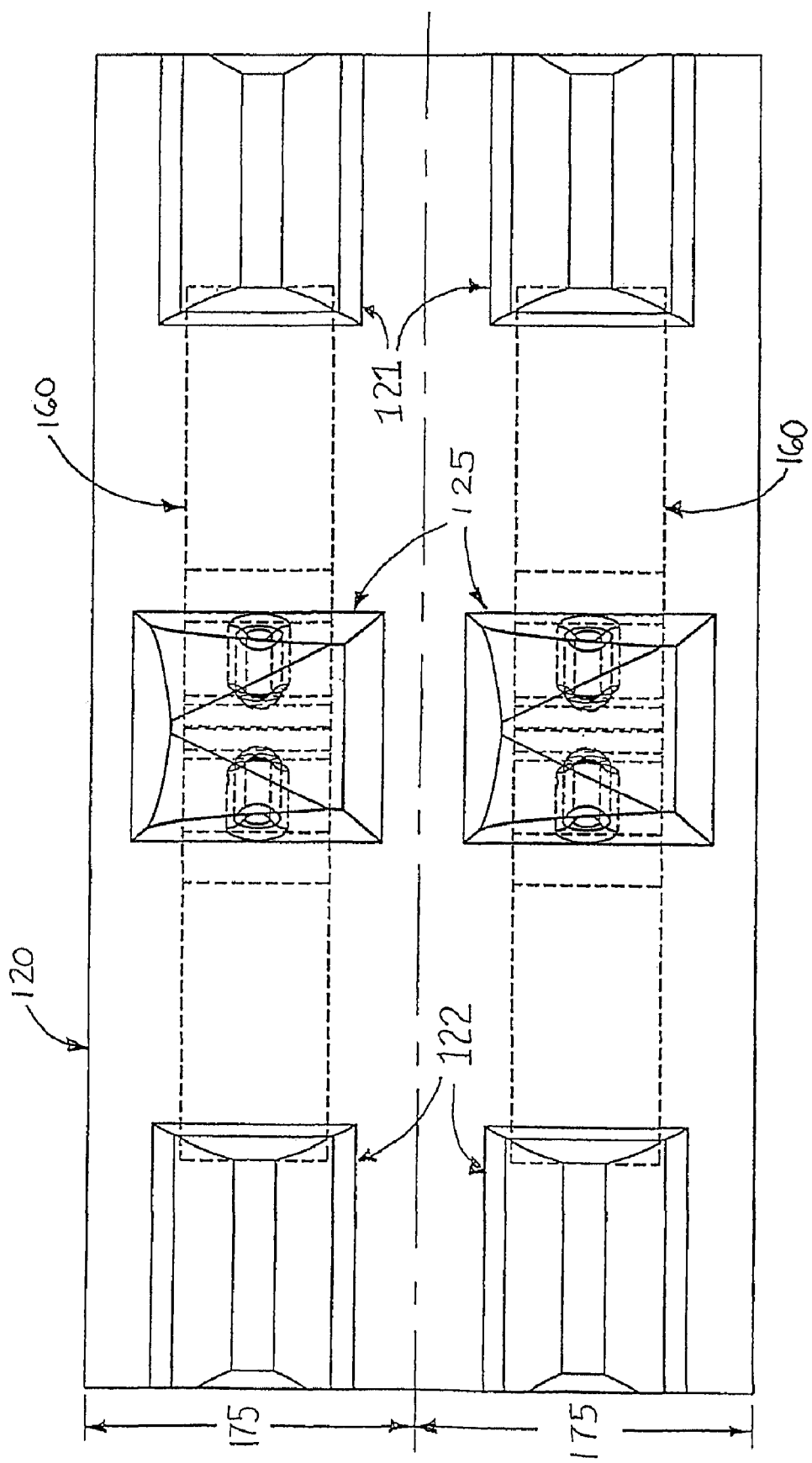
FIG. 6 is top view of a traction band equipped with the guide horn reinforcements shown in FIG. 1.

FIGS. 5 and 6 illustrate into more details the general configuration of an endless track 120 in accordance with the invention and show how it is mounted with respect to the vehicle 100 and its plurality of wheels (130, 140 and 150). In this embodiment, the endless track 120 comprises a longitudinally extending main track body 124 having a first lateral edge 131 and a second lateral edge 132, a thickness 133 and a neutral axis 134. As it is known in the art, the neutral axis of a body is the zero strain zone of the flexed or bent body. Thus, in the context of the present invention, the neutral axis of the track is the zone or line 134, along its thickness 133, which is subjected neither to compression nor tension when the track bends, for example, around the sprocket wheel 130. The track body 124 further comprises an inner wheel-engaging surface 128 and an outer ground-engaging surface 126.

In the embodiment shown in FIG. 5, the body 124 of the track 120 generally comprises a central band portion 173 and lateral band portions 171 and 172 which are located on each side of the central band portion 173. The traction band 120 further comprises, on the inner surface 128 and generally along the central band portion 173, a plurality of longitudinally aligned guide lugs 125. In order to provide power transmission from the sprocket wheel 130 to the track 120, the latter comprises, on the inner surface 128 and generally along the first and second lateral band portion 171 and 172, rows of longitudinally aligned drive lugs 121 and 122. Preferably, the drive lugs 121 and 122 are respectively disposed near the lateral edges 131 and 132 of the track body 124.

As best shown in FIG. 5, the rows of drive lugs and guide lugs are laterally spaced apart in order to define first and second wheel paths 141 and 142. The wheel paths 141 and 142 allow the passage of the plurality of wheels 150 comprising sections 151 and 152.

Figure 9:
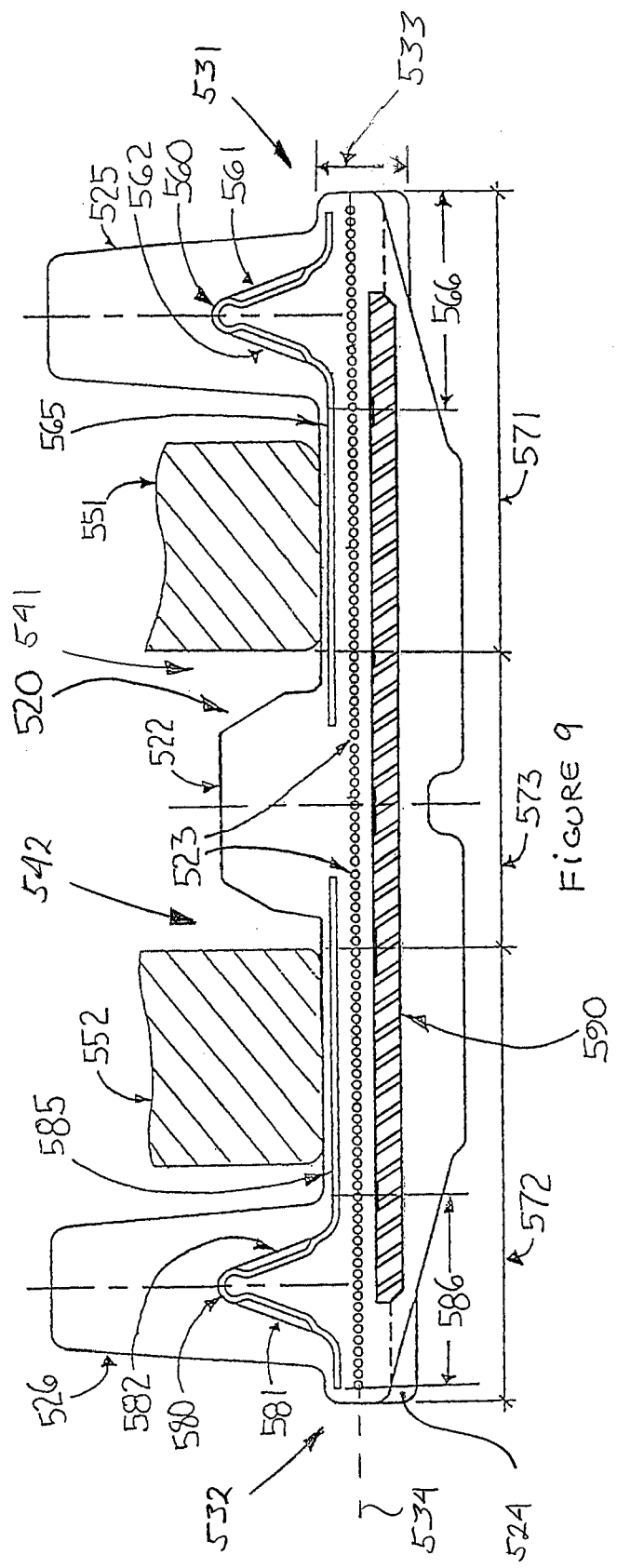
FIG. 9 is a section view taken along line 5-5 in FIG. 4 showing another embodiment of the guide horn reinforcement.

Alternatively, in a second embodiment shown in FIG. 9, the drive lugs 522 are located in a central row and the guide lugs 525 and 526 are located in two lateral rows on each side of the row of drive lugs 522.

Referring now to FIGS. 5 and 5C, the outer surface 126 of the track body 124 supports ground-engaging lugs 127 which come in multiple designs to adapt to various types of soil. The ground-engaging lugs 127 are usually disposed over the entire lateral width of the endless elastomeric traction band 120 and along its entire outer circumference. Ground-engaging lugs 127 are usually grouped and each group is generally separated by a laterally extending lugless area, and their alternate sequence provides stability in rotation along the vertical axis (twisting) and the longitudinal axis (torsion) of the traction band 120, therefore minimizing de-tracking occurrences and ensuring a proper vehicle traction on soft terrains.

The elastomeric traction band 120 is lightweight and pliable, yet reinforced with longitudinally extending main reinforcing tensile cables 123, generally comprising several fibers, which usually extend in a longitudinal direction and are embedded into the track body 124 of the traction band 120, preferably along the neutral axis 134 thereof. Though other configurations are possible, the reinforcing cables are preferably adjacently disposed in a laterally extending and continuous close array as shown in FIG. 5.

As best shown in FIGS. 5, 5C and 9, the elastomeric track 120 further comprises laterally extending stiffening elements 180 (e.g. bars, rods) preferably made of rigid yet resilient composite materials such fiberglass. These stiffening elements 180 are embedded into the track body 124 along the circumference of the endless track 120. Preferably, the stiffening elements 180 are disposed between the reinforcing cables 123 (i.e. neutral axis 134) and the outer surface 127 of the track body 124 in order to minimize the thickness of the track body 124 between the reinforcing cables 123 (i.e. neutral axis 134) and the inner surface 128.

As seen in FIGS. 4 and 5, the endless traction band 120 rotates around the tension wheel 140 and a plurality of road wheels 150, comprising a first section 151 and a second section 152. The row of guide horns 125 is maintained between the wheels' sections 151 and 152 and therefore helps to laterally stabilize the wheels/traction band assembly as the traction band 120 rotates. When the traction band 120 is used under extreme conditions, de-tracking events sometimes occur, even if such guide horns 125 are used.

It has been found that when guide lug reinforcements 160 in accordance with the present invention are provided in the guide lugs 125, de-tracking occurrences are minimized, even after a combined action of high lateral forces on the traction band 120 are coupled with friction and interference between the wheels (130, 140 and 150) and the guide lugs 125.

For instance, when the traction band 120 in operation sees high levels of lateral forces, the guide lugs 125 laterally deform as some of the plurality of wheels (130, 140 or 150) start interfering and sometimes climbing on the guide lugs 125. At this stage, for traction bands of the prior art, a de-tracking event is likely to be initiated. However, the use of guide lug reinforcements 160 significantly reduces the occurrence of de-tracking by considerably limiting the deformation of the elastomeric material with the provision of a rigid yet resilient lateral support.

A guide lug reinforcement 160 is inserted in the traction band 120 to laterally support and reinforce the guide lugs 125. In FIGS. 5C and 6, each pitch 175 comprises a guide lug reinforcement 160 (shown in dotted line) which is preferably aligned in a lateral direction with a guide lug 125 and the drive lugs 121 and 122, along the entire circumference of the traction band 120.

Figure 3:
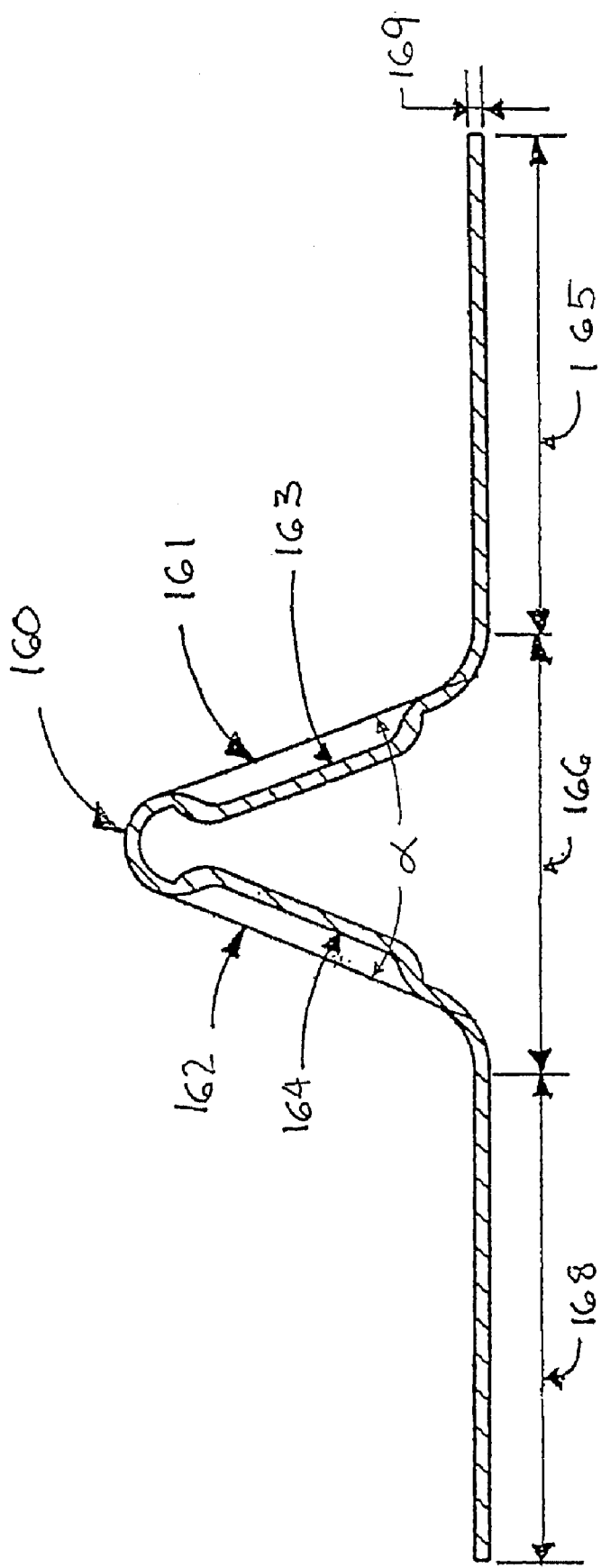
FIG. 3 is a longitudinal view illustrating the guide horn reinforcement shown in FIG. 1.

FIGS. 1 and 3 describe in detail the physical characteristics of a guide lug reinforcement 160 according to a preferred embodiment. Each guide lug reinforcement 160 either consists in a formed plate, a matrix of cords, rods or fabric which comprises a preferably, but not exclusively, inverted V-shaped reinforcing portion 166 and two stabilizing portions 165 and 168, which are located on each side of the reinforcing portion 166. Any material that can be formed or allow the configuration or assembly of a more rigid structure than the elastomeric material, like, for instance, resilient metals such as steel and aluminum, textiles, polymers or other metal alloys, can be used.

The stabilizing portions 165 and 168 are preferably flat, since their requirement is to locate and maintain the position of the guide lug reinforcement 160. As seen in FIGS. 5 and 5C, the stabilizing portions 165 and 168 are embedded in the main band body 124 and preferably located between the reinforcing cables 123 and the inner surface 128. Stabilizing portions 165 and 168 respectively laterally extend toward the first edge 131 and the second edge 132, and preferably respectively over the width of the wheel paths 141 and 142 and over at least a portion of the width of the drive lugs 121 and 122. Additionally, as best at shown at 181, the total width of the guide lug reinforcements 160 is preferably smaller than the total width of the stiffening elements 180.

Figure 2:
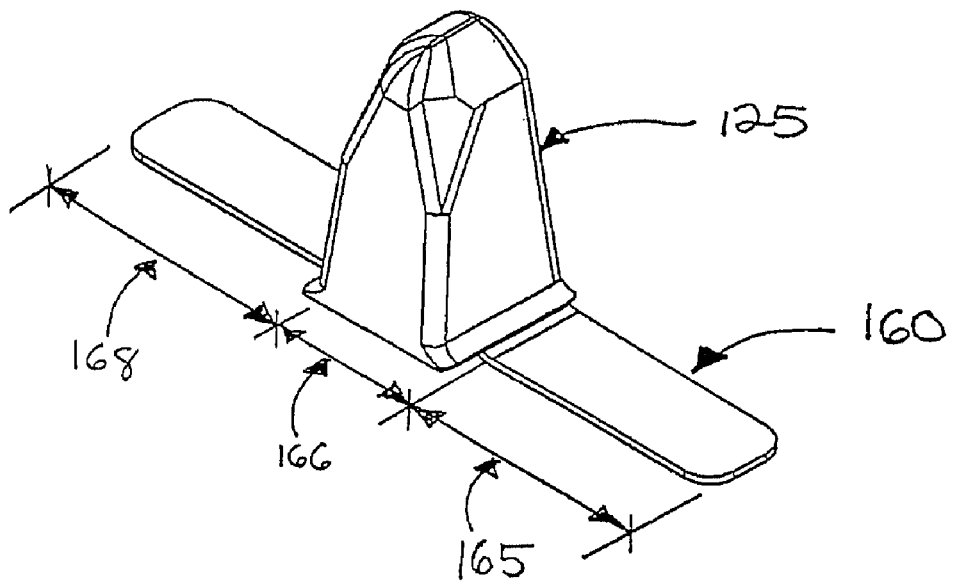
FIG. 2 is an isometric view illustrating the guide horn reinforcement shown in FIG. 1, which is partly embedded in a guide horn.

The reinforcing portion 166 comprises a formed plate or fabric structure, configured to provide tensional rigidity to the guide lugs 125 and which is preferably completely embedded in it, as shown in FIG. 2.

In accordance with the present invention, the reinforcing portion 166 generally extends into the guide lug 125 beyond 50% of the height thereof (see guide lug reinforcement 160' in FIG. 5A). Preferably, the reinforcing portion 166 extends into the guide lug 125 between 70% and 90% of its height and most preferably, between 80% and 90% (see guide lug reinforcement 160" in FIG. 5B).

In the preferred embodiment illustrated in FIGS. 1 and 5, the generally inverted V-shaped reinforcing portion 166 comprises inclined planar areas 161 and 162 which extend in a longitudinal direction and connect to each other at an angle α. The angle α is selected so that the inclined planar areas 161 and 162 are fully contained within the volume delimited by the corresponding guide lug 125, which in turn has a lateral width constraint. Indeed, the central band portion 173 of FIG. 5, where the guide lug 125 is located, is generally determined by the fixed spacing between the two longitudinally split sections 151 and 152 of wheels 150.

In order to optimize the lateral rigidity of the reinforcing portion 166 of the guide lug reinforcement 160, embossings 163 and 164 can be added to the inclined planar areas 161 and 162 when a rigid yet formable material is used (e.g. steel). High lateral loads on the guide lug reinforcement 160 induce moments on the reinforced planar areas 161 and 162 along a longitudinal axis, especially when they are applied at a higher distance from the stabilizing portions 165 and/or 168. A formed plate has less inertial resistance to such a moment, due to its small thickness 169, but embossings 163 and 164 enhance its inertial resistance to lateral forces. The embossings 163 and 164 can be concave or convex, of any shape or size, being only limited by the available volume space inside each guide lug 125. Other strengthening means can also be added to the reinforcing portion 166 to provide a similar lateral rigidity as the embossings 163 and 164 do for the inclined planar area 161 and 162. The present invention is not so limited.

Figure 7:
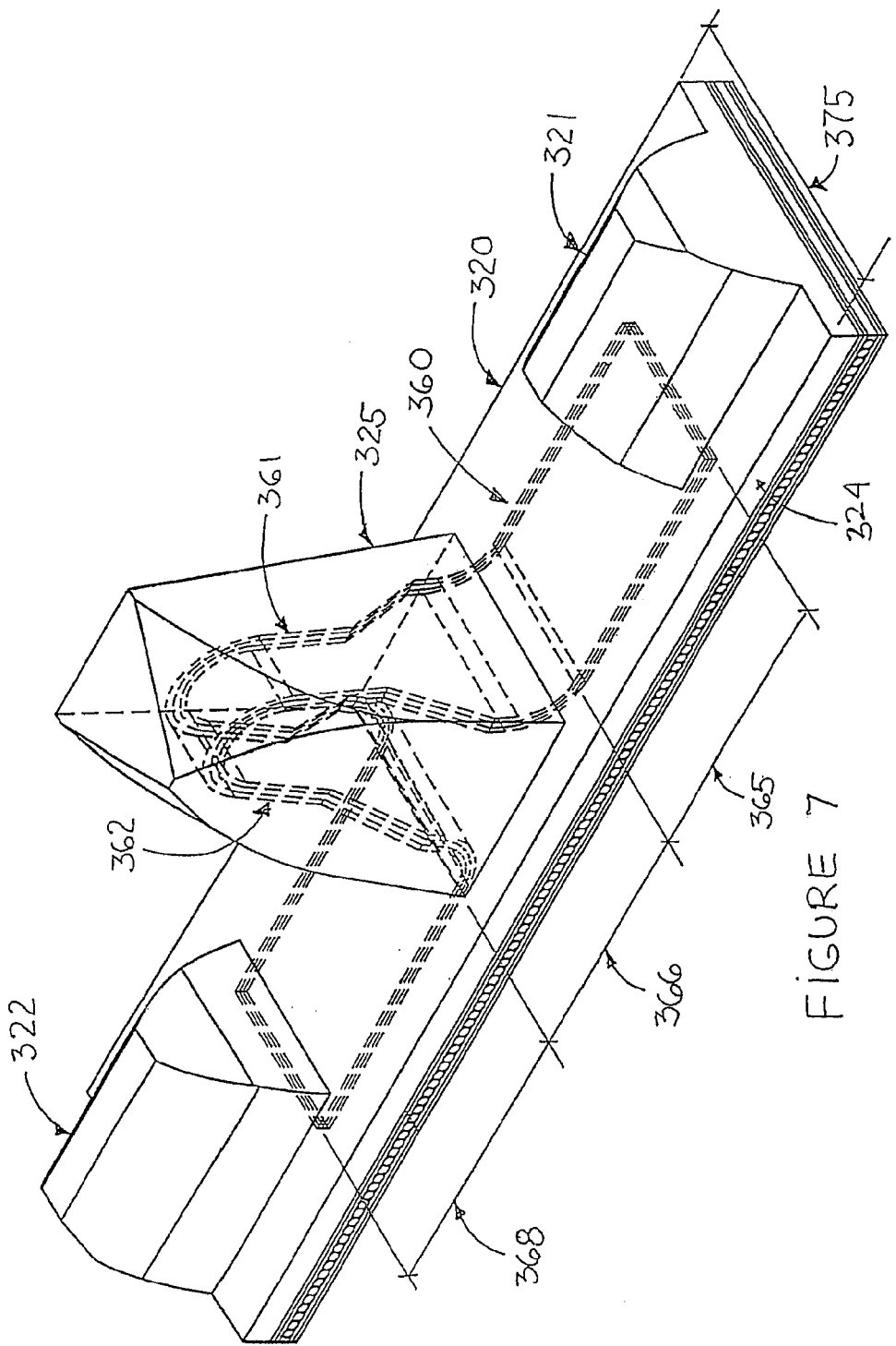
FIG. 7 is an isometric view of another embodiment of the invention shown in FIG. 1.

FIG. 7 illustrates a third embodiment of the invention, where each pitch 375 of the traction band 320 comprises a lug reinforcement 360 having a reinforcing portion 366 and two stabilizing portions 365 and 368 on each side of the reinforcing portion 366. The stabilizing portions 358 and 368 are embedded into the band body 324 in a fashion similar to stabilizing portions 165 and 168 of the lug reinforcement 160. Hence, stabilizing portion 365 laterally extends toward and partially underneath drive lugs 321 whereas stabilizing portion 368 laterally extends toward and partially underneath drive lugs 322. The generally inverted V-shaped reinforcing portion 366 is made of two longitudinally extending inclined planar areas 361 and 362 connected together at an angle α. In this embodiment, the inclined planar areas 361 and 362 have a longitudinally variable width in order to occupy, and therefore reinforce, most of the volume of the guide lug 325.

Figure 8:
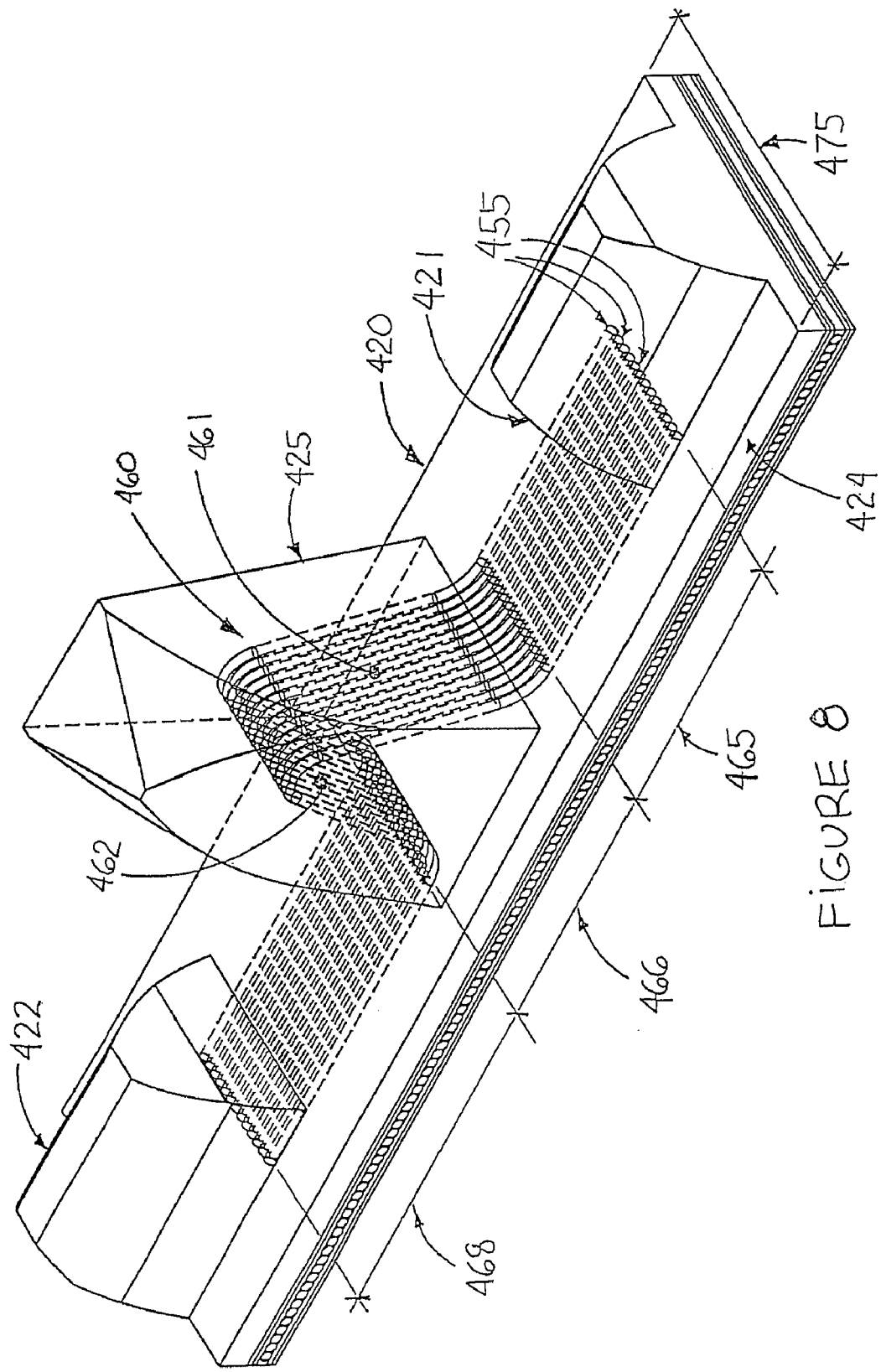
FIG. 8 is an isometric view of another embodiment of the invention shown in FIG. 1.

A fourth embodiment is described in FIG. 8. In each pitch 475 of the traction band 420, a guide lug reinforcement 460 is made of a selected number of cords or rods 455. Each cords or rods 455 have a lateral bi-dimensional profile comprising a reinforcing portion 466 and a pair of stabilizing portions 465 and 468 located on each side of the reinforcing portion 466. The generally inverted V-shaped reinforcing portion 466 is mainly located in the guide lug 425 and the longitudinal juxtaposition of each cords or rods 455 defines two inclined planar areas 461 and 462 which are at an angle α (not shown). The stabilizing portions 465 and 468 are embedded in the band body 424, in a fashion similar to stabilizing portions 165 and 168 of the lug reinforcement 160. Hence, stabilizing portion 465 laterally extends toward and partially underneath drive lugs 421 whereas stabilizing portion 468 laterally extends toward and partially underneath drive lugs 422.

As seen in FIGS. 4 and 5, the use of guide lug reinforcements 160 in a traction band 120 significantly reduces de-tracking events by reducing the deformation of the elastomeric material in the guide lugs 125. This phenomenon is firstly explained by the stabilizing portions 165 and 168 which are embedded into the traction band 120 and which are located under the weight of at least part of the plurality of road wheels 150, therefore providing a laterally rigid and stable guide lug reinforcement with respect to the traction band 120. The reinforcing portion 166 acts to significantly reduce the relative lateral movement between the rotating traction band 120 and the wheel 150 nearest to the high lateral load which is seeking to cause a de-tracking event. The inclined planar areas 161 and 162 first absorb and then redirect the misaligned track 120 toward the normal operating position as the track continues to rotate around the plurality of wheels (130, 140 and 150). The vehicle 100 can therefore continue to move since the high lateral load source on the terrain is absorbed by the traction band 120 and the de-tracking event avoided.

Additionally, by being physically distinct from the laterally extending stiffening elements 180 or 590, and by being separated therefrom by one or more intermediate layers of elastomeric materials, the guide lug reinforcements 160 and the intermediate layers can absorb a portion of the lateral and/or shear forces applied to the guide lugs 125 without directly transmitting them to the stiffening elements 180. Accordingly, lateral forces applied to the guide lugs 125 do not directly result in a rotational or torsional movement of the whole track 120 as in prior art tracks. Furthermore, since the guide lug reinforcements 160 do not provide lateral rigidity to the body 124 of the track 120, the stabilizing portions 165 and 168 thereof can advantageously be flat and therefore minimize the thickness of the portion of the body 124 which is located between the neutral axis and the inner surface.

If the high lateral load source is felt on one of the arched portion of the traction band 120, which represents the band portions near the tension wheel 140 or the sprocket wheel 130, the lateral support offered by the guide lug reinforcements 160 is also enhanced since the guide lugs 125 get closer to one another in that portion of the band 120. Consecutive guide lugs 125 in those arched portions have closer guide lug reinforcements 160 with closer consecutive inclined planar areas 161 and 162 which provide a more integral lateral band support to the wheel/traction band assembly.

As partially described above, another traction band embodiment which can be useful for other configurations of tracked vehicle is illustrated in FIG. 9. The traction band 520 has a reversed lug configuration when compared to the preferred embodiment of FIG. 5. On the central band portion 573, which is generally determined by the fixed spacing between the two longitudinally split sections 551 and 552 of wheels 550, one row of drive lugs 522 ensures power transmission from the vehicle to the traction band 520. Two rows of guide lugs 525 and 526 are respectively located on lateral band portions 571 and 572 near the edges 531 and 532 and are reinforced by guide lug reinforcements 560 and 580. Guide lug reinforcements 560 and 580 respectively comprise a reinforcing portion 566 and 586, being respectively contained in each guide lug 525 and 526, and at least one stabilizing portion 565 and 585 embedded in the band body 524 preferably between the reinforcing cables 523, located at the neutral axis 534 and the inner surface of the body 524. The reinforcing portions 566 and 586 can be made in any shape or form, but preferably has the same configuration as the other embodiments stated hereinabove. In FIG. 11, two inclined planar areas 561 and 562, and 581 and 582 are connected to each other as in the preferred embodiment. Also, similarly to the embodiment of FIG. 5, the stabilizing portion 565 of the guide lug reinforcement 560 extends laterally toward the second edge 532 of the body 524 and over the width of the wheel path 541 and over a portion of the width of the drive lug 522, whereas the stabilizing portion 585 of the guide lug reinforcement 580 extends laterally toward the first edge 531 of the body 524 and over the width of the wheel path 542 and over a portion of the width of the drive lug 522.

While a preferred embodiment of the invention has been described herein, it should be apparent to those skilled in the art that variations and modifications are possible without departing from the spirit of this invention.

The invention claimed is:

1. An endless track for use on a tracked vehicle comprising a plurality of road wheels and at least one sprocket wheel, said endless track comprising:
   a) a longitudinally extending track body made of elastomeric material, said track body having a first lateral edge, a second lateral edge and a thickness, said track body defining an inner wheel engaging-surface, an outer ground-engaging surface, and a laterally extending neutral axis located intermediate said inner wheel engaging-surface and said outer ground-engaging surface;
   b) a row of longitudinally aligned guide lugs disposed along on said inner surface of said track body, said guide lugs being not drivingly engaged by said sprocket wheel;
   c) a first row of longitudinally aligned drive lugs disposed on said inner surface of said track body adjacent said first lateral edge, said first drive lugs being drivingly engaged by said sprocket wheel, said first row of drive lugs being laterally spaced from said row of guide lugs to define a first wheel path;
   d) a second row of longitudinally aligned drive lugs disposed on said inner surface of said track body adjacent said second lateral edge, said second drive lugs being drivingly engaged by said sprocket wheel, said second row of drive lugs being laterally spaced from said row of guide lugs to define a second wheel path;
   e) ground-engaging lugs disposed on said outer surface of said track body;
   f) longitudinally extending reinforcing cables embedded into said track body substantially at said neutral axis;
   g) laterally extending stiffening elements embedded into said track body between said reinforcing cables and said outer surface;
   h) guide lug reinforcements, distinct from said stiffening elements, comprising a reinforcing portion outwardly extending into said guide lugs, a first resilient stabilizing portion laterally extending toward said first lateral edge, over the width of said first wheel path and over at least a portion of the width of said first row of drive lugs, and a second resilient stabilizing portion laterally extending toward said second lateral edge, over the width of said second wheel path and over at least a portion of the width of said second row of drive lugs, said first and second stabilizing portions being embedded into said track body between said reinforcing cables and said inner surface.

2. An endless track as claimed in claim 1, wherein said guide lug reinforcements have a width and wherein said stiffening elements have a width, and wherein the width of said guide lug reinforcements is equal or smaller than the width of said stiffening elements.

3. An endless track as claimed in claim 1, wherein said reinforcing portion of said guide lug reinforcements has a height and wherein said guide lugs have a height, and wherein the height of said reinforcing portion is at least 50% of the height of said guide lugs.

4. An endless track as claimed in claim 3, wherein the height of said reinforcing portion is between 70% and 90% of the height of said guide lugs.

5. An endless track as claimed in claim 3, wherein the height of said reinforcing portion is between 80% and 90% of the height of said guide lugs.

6. An endless track as claimed in claim 1, wherein said reinforcing portion of said guide lug reinforcements defines an inverted "V" shape.

7. An endless track as claimed in claim 1, wherein said stiffening elements, said reinforcing cables and said stabilizing portions are each separated by a layer of elastomeric material.

8. An endless track for use on a tracked vehicle comprising a plurality of road wheels and at least one sprocket wheel, said endless track comprising:
   a) a longitudinally extending track body made of elastomeric material, having a first lateral edge, a second lateral edge and a thickness, said track body said track body defining an inner wheel engaging-surface, an outer ground-engaging surface, and a laterally extending neutral axis intermediate said inner wheel engaging-surface and said outer ground-engaging surface;
   b) at least one row of longitudinally aligned guide lugs disposed on said inner surface of said track body, said guide lugs being not drivingly engaged by said sprocket wheel;
   c) at least one row of longitudinally aligned drive lugs disposed on said inner surface of said track body, said drive lugs being drivingly engaged by said sprocket wheel, said row of drive lugs being laterally spaced from said row of guide lugs to define a wheel path;
   d) ground-engaging lugs disposed on said outer surface of said track body;
   e) longitudinally extending reinforcing cables embedded into said track body substantially at said neutral axis;
   f) laterally extending stiffening elements embedded into said track body between said reinforcing cables and said outer surface;
   g) guide lug reinforcements, distinct from said stiffening elements, comprising a reinforcing portion outwardly extending into said guide lugs, a resilient stabilizing portion laterally extending toward said row of drive lugs, over the width of said wheel path and over at least a portion of the width of said row of drive lugs, said stabilizing portions portion being embedded into said track body between said reinforcing cables and said inner surface.

* * * * *